United States Patent

[11] 3,604,186

| [72] | Inventor | Martin W. Coleman<br>Independence, Mo. |
|---|---|---|
| [21] | Appl. No. | 3,996 |
| [22] | Filed | Jan. 19, 1970 |
| [45] | Patented | Sept. 14, 1971 |
| [73] | Assignee | Allis-Chalmers Manufacturing Company<br>Milwaukee, Wis. |

[54] COMBINE HARVESTER
6 Claims, 6 Drawing Figs.

| [52] | U.S. Cl. | 56/208 |
|---|---|---|
| [51] | Int. Cl. | A01d 67/00 |
| [50] | Field of Search | 56/208,<br>14.6, 214 |

[56] References Cited
UNITED STATES PATENTS

| 3,461,655 | 8/1969 | Van der Lely | 56/208 |
|---|---|---|---|
| 3,509,701 | 5/1970 | Clark | 56/208 |

*Primary Examiner*—Russell R. Kinsey
*Attorneys*—Kenneth C. McKivett, Arthur L. Nelson and Robert B. Benson ABSTRACT: A combine harvester having a pivotally mounted header including a hydraulic ram for raising and lowering the header. A valve mounted on the hydraulic cylinder communicating with the hydraulic system for permitting raising of the header when the hydraulic system is actuated but preventing lowering of the header unless both the hydraulic system is so actuated and a poppet in such valve is moved to a lowering position.

COMBINE HARVESTER

This invention relates to a self-propelled combine harvester and more particularly for means for retaining the header thereof in a desired raised position.

It is an object of this invention to provide means for retaining the header of a combine harvester in raised position hydraulically even though the engine of the harvester is not operating or is not driving the hydraulic pump of the combine.

A further object of this invention is to provide remote control means for operating a valve for permitting the lowering of the header of a combine harvester.

A further object of this invention is to locate the operating portion of such remote control means at the operator's station in a position so that the control means can be operated from the operator's station or from the ground when the operator is not under the header.

A further object of this invention is to provide means for retaining the header of a combine harvester in elevated position by hydraulic means and wherein such means incorporates a relief valve for limiting the pressure in the hydraulic cylinder.

A further object of this invention is to provide means for retaining the header of a combine in raised position and wherein such header can be raised from such position by actuating a hydraulic valve but cannot be lowered unless control means for lowering is actuated.

A further object of this invention is to provide a poppet valve control means for retaining the cylinder of a combine harvester header in extended position and wherein such poppet valve control means is positioned on said cylinder thus eliminating hydraulic hose connection between the control means and the cylinder.

Other objects and advantages will become apparent upon reading the following description in light of the accompanying drawings, wherein.

Figure 1:
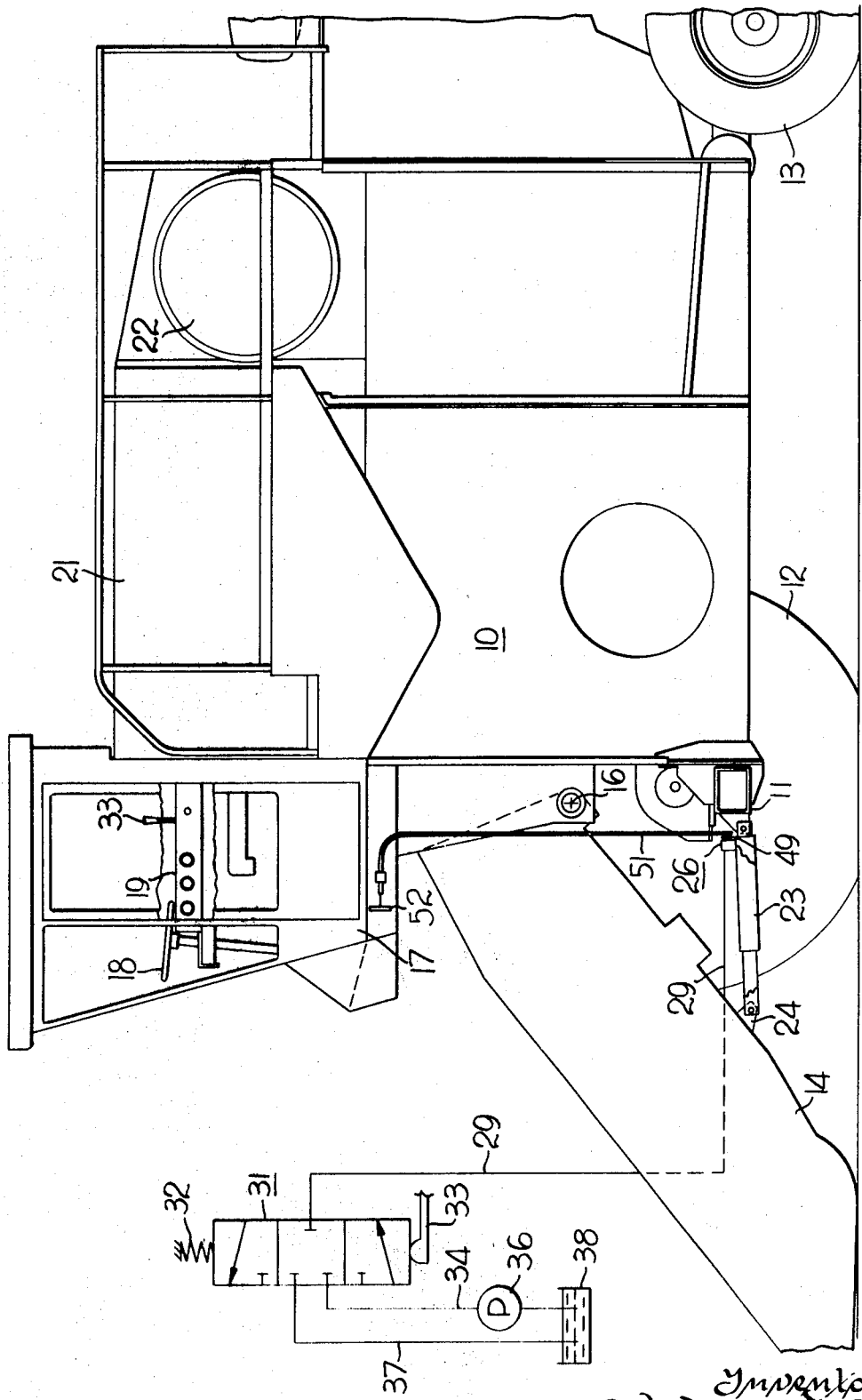
FIG. 1 is a side elevation of a combine harvester embodying the invention with part of the drawing being schematic and some parts being removed for clarity of illustration.
Figure 2:
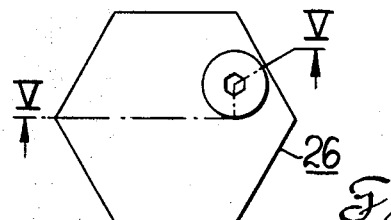
FIG. 2 is a plan view of the valve embodying the invention.

Referring to FIG. 1, a self-propelled combine harvester 10 having a frame 11 supported on traction wheels 12 and dirigible wheels 13 is seen. The combine is provided with a header 14 pivotably mounted on the frame 11 to pivot about transverse axis 16. An operator's station 17 is mounted on frame 11 in overlying relation to the rear end of header 14 and includes the usual steering wheel 18 and console 19 containing the usual operating levers and gauges. A grain tank 21 is mounted to the rear of station 17 and an internal combustion engine 22 is mounted to the rear of grain tank 21. Engine 22 is operatively connected to the various elements of the combine for driving same in a conventional manner by means (not shown).

A hydraulic cylinder 23 has its cylinder end pivotally connected to frame 11 and its piston end pivotally connected to flange 24 forming a part of header 14. A valve 26 is attached to cylinder 23 by means of a threaded nipple 27 (see FIG. 3). Valve 26 is provided with an opening 28 (see FIG. 4) for receiving one end of hydraulic line 29 (see FIG. 1) which is connected at the other end thereof to a hydraulic system including a valve 31 which is shown diagrammatically in FIG. 1 but which would be normally located in console 19. Valve 31 is a control means for the hydraulic system and normally biased to a closed position by spring 32 (as shown in FIG. 1). Operating member 33 can be actuated by the operator to move valve 31 to a header raise position wherein line 29 will be lined up with delivery line 34 of pump 36 or to a header lower position wherein line 29 is lined up with line 37 for returning fluid to sump 38.

Figure 3:
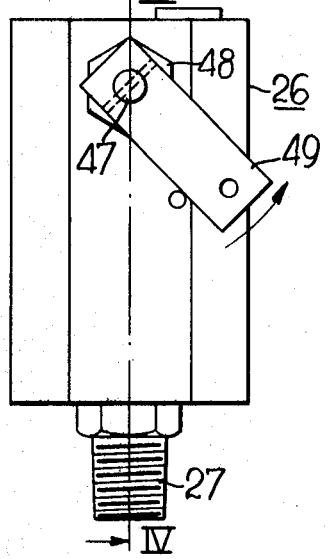
FIG. 3 is a side elevation of the valve shown in FIG. 2.
Figure 4:
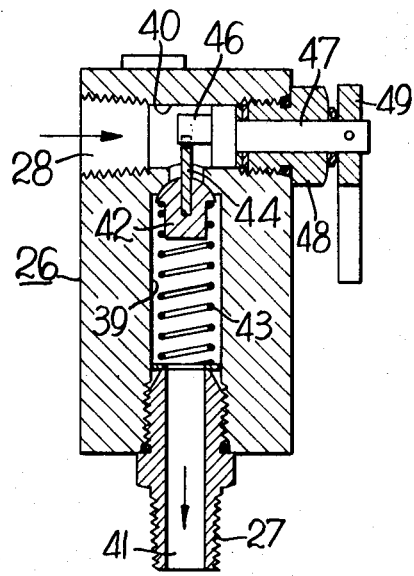
FIG. 4 is a section view taken on line IV—IV of FIG. 3.
Figure 5:
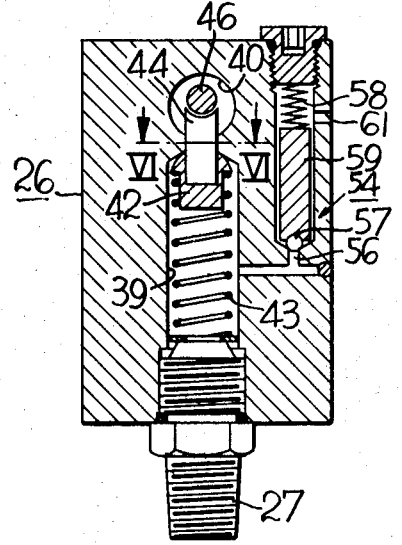
FIG. 5 is a section view taken on line V—V of FIG. 2.
Figure 6:
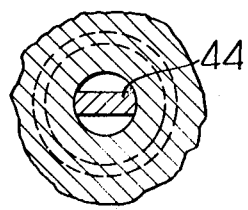
FIG. 6 is a section view taken on line VI—VI of FIG. 5.

Valve 26 (see FIG. 4) is provided with a central passage 39 which connects with transverse passage 40 at its upper end and at its lower end with a passage 41 in nipple 27. Vertically mounted in passage 41 is a poppet 42 which is biased by spring 43 to close off passage 39. The upper end of poppet 42 is provided with a member 44 which extends upwardly into passage 40 for coaction with a cam 46 mounted on a pivot pin 47 pivotally mounted in retainer 48 received in passage 40. Pivot pin 47 is provided with lever member 49 attached to the outboard end thereof. Referring to FIG. 1, a member 51 is pivotally attached at one end to the outboard end of member 49 and member 51 is attached at the other end to operating member 52 mounted in console 19. Operating member 52 is biased by means (not shown) for retaining operating handle 49 in the position shown in FIG. 4. When valve 26 is positioned as shown in FIGS. 3, 4 and 5, poppet 42 closes off passage 39 and prevents fluid from flowing towards opening 28 but fluid can flow from opening 28 through passage 39 if the pressure thereof is sufficient to overcome the pressure being exerted by poppet spring 43. Accordingly, it is thus seen that despite the fact that valve 31 may be adjusted to lower header 14, such lowering will not take place as long as poppet 42 is positioned as shown. In order to produce a lowering of header 14 it is necessary that operating handle 52 (FIG. 1) be actuated by the operator to move member 51 upwardly thus pivoting pin 47 (FIG. 4) and causing cam 46 to engage member 44 of poppet 42 and thus to move poppet 42 away from a closing position of passage 39. Hydraulic fluid will then be able to flow from hydraulic cylinder 23 back through passage 29 through lowering header 14.

Referring to FIG. 5 a relief valve 54 is provided for relieving excess pressure that might build up in passage 39. This valve includes a passage 56 which communicates with passage 39. A ball 57 is biased by spring 58 and plug 59 to be retained blocking passage 56. In the event that the pressure in passage 39 should become excessive then ball 57 would be raised from its seat by such pressure permitting hydraulic fluid to move through valve 54 and out of passage 61 until the pressure had been sufficiently reduced so that spring 58 could again bias ball 57 into a position closing off passage 56.

It is to be noted that operating handle 52 is located on the ladder deck so that it can be operated either from the deck or from the ground. Operating handle 52 is normally locked by means (not shown) in a position that keeps poppet 42 unseated. If the operator wants to work under the header he actuates handle 52, allowing poppet 42 to seat, then he relocks operating handle 52. Operating handle 52 is so located that the operator can reach handle 52 from the ground in case he decides to get under the header while he is not in the operator compartment.

In positioning valve 26 directly on hydraulic cylinder 23, the risk of broken hoses between valve 26 and cylinder 23 is eliminated.

The embodiments of the invention in which an exclusive property or privilege is claimed are defined as follows:

1. In combination in a self-propelled harvester thresher having an operator's station, a hydraulic system and a header pivotally mounted on said harvester for raising and lowering movement about a transverse axis, a hydraulic cylinder carried by said harvester and being connected to said header and said hydraulic system for raising and lowering said header, control means for actuating said hydraulic system, valve means directly connected to said hydraulic cylinder and being biased to a position retaining said cylinder in extended relation maintaining said header in raised position independent of said control means.

2. The combination recited in claim 1 and wherein said valve means includes a poppet positioned between said hydraulic system and said cylinder for permitting hydraulic fluid to enter said hydraulic cylinder even when said poppet is positioned to retain hydraulic fluid in said cylinder.

3. The combination recited in claim 2 and wherein said valve permits fluid to enter said cylinder but prevents fluid from leaving said cylinder.

4. The combination recited in claim 3 and wherein said valve includes an overload means for limiting the pressure within said cylinder.

5. The combination recited in claim 4 and wherein manual means for controlling said valve is provided and such means being carried by said harvester and being actuable only from a position space removed from said header.

6. The combination recited in claim 5 and wherein said manual means are positioned on the ladder deck of said operator's station and can be operated from the deck or ground.